Oct. 2, 1928.
C. BORNMANN
FILM PACKAGE
Filed April 8, 1927
1,685,802
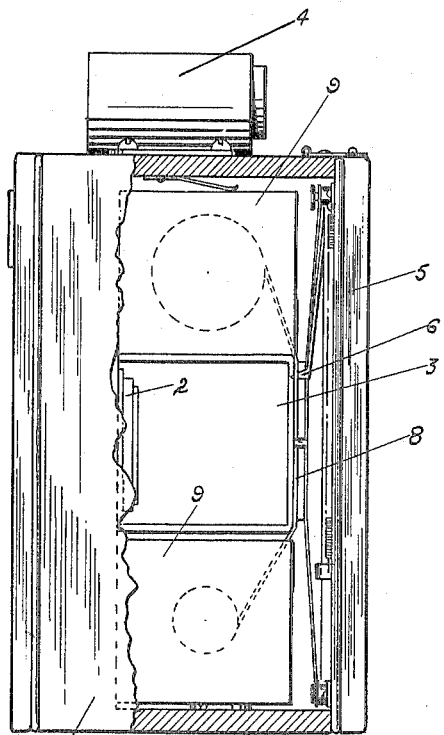
Fig.1.
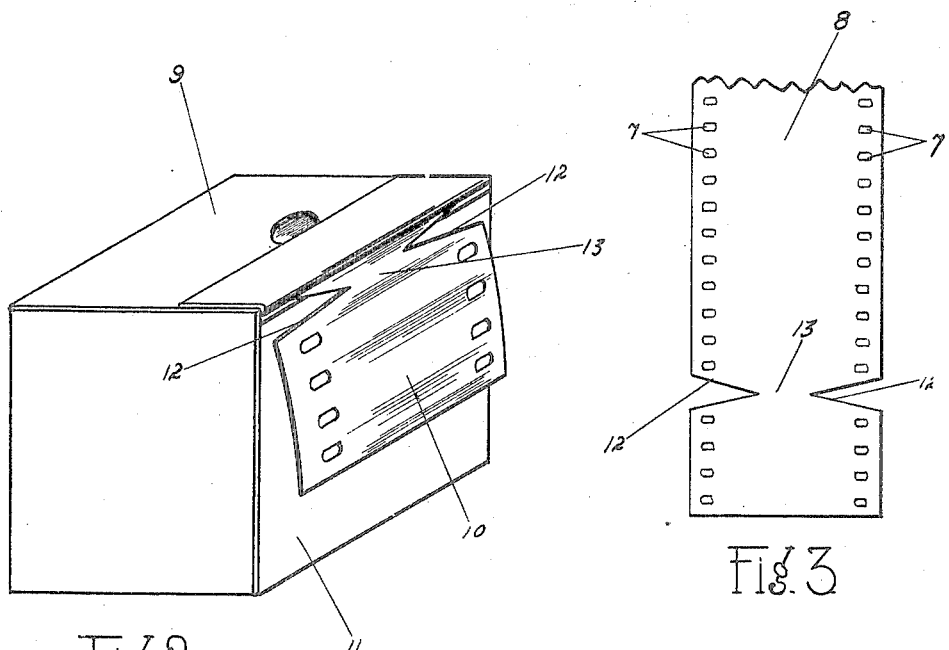
Fig.2.
Fig.3
INVENTOR
CARL BORNMANN.
Philip S. Hopkins
ATTORNEY Patented Oct. 2, 1928.

1,685,802

UNITED STATES PATENT OFFICE.

CARL BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

FILM PACKAGE.

Application filed April 8, 1927. Serial No. 182,122.

My invention relates to photographic film cartridges, and particularly to that type wherein the strip of film is coiled within a box or casing from which it is adapted to be moved step by step through the camera and then rewound within a similar box.

The principal object of my invention is to provide means for greatly facilitating the threading and feeding of such a strip of film from one package into another as the same is passed through a camera.

Other objects and advantages by way of detail will be apparent as the description proceeds, reference being had to the figures of the drawing wherein like reference numerals indicate like parts.

In the drawing:—

Figure 1 is a side view of a photographic camera, in connection with which my invention is utilized, certain parts being broken away for clearness of illustration.

Figure 2 is a perspective view of a film package embodying my invention.

Figure 3 is a detail plan view of a strip of film, the end of which is formed in accordance with my invention.

The reference numeral 1 refers to a photographic camera, provided with the lens and shutter 2, exposure chamber 3, view finder 4, and removable back 5, carrying the reciprocating claw 6 engageable within the perforations 7 of the film 8 whereby the film may be moved past the exposure chamber 3.

The film cartridges or boxes 9 within which the film 8 is coiled are adapted to be placed within the camera on either side of the exposure chamber 3 as shown in Figure 1. It has not been deemed necessary to show the detailed construction inside the box 9 as this forms no part of my invention. Suffice it to say that the film 8 is adapted to be coiled within itself within such boxes, there being provided spring guides within the boxes to facilitate the coiling of the film as it is drawn from one box and forced into the other.

In practice these film magazines or cartridges are furnished as shown in Figure 2, with one end of the film extending out of the box to permit the threading of the same from the upper box 9 in Figure 1, past the exposure chamber 3 and into the lower box 9 wherein it is coiled upon itself as the film is drawn downwardly by the claw 6. The wrapping and packing of these film cartridges 9 for transportation and sale obviously results in bending the exposed free end 10 of the film strip against the side wall 11 of the box in which position it remains until unwrapped for use. Such bending and folding of this end 10 of the film causes the film to kink at the point of bending, namely at the point at which it protrudes from the box, which kink becomes more permanent as the package is left wrapped. The kink thus formed adjacent the end of the film is extremely detrimental to the winding operation of the film into the receiving magazine within the camera due to the fact that it is with difficulty that the end so kinked will be guided by the spring guide within the box and coil upon itself in the manner necessary to the easy winding of the film from one box to the other.

To overcome this difficulty, I have provided adjacent the end of the film substantially V-shaped cuts 12 extending inwardly from the sides of the film directly opposite each other and leaving only a narrow portion 13 between the inner ends of such cuts.

In using my invention, the packer of the film at the factory leaves only that portion of the end 10 of the film lying between the cut out portions 12 and the extreme end thereof, protruding from the box. The aforementioned kink or bend, therefore, comes at the point 13 between the cut-out portions. When it is desired to use the film in the camera, the operator grasps the end 10 of the film and pulls it out a short distance, then tears off the end 10 along the line 13 between the cut out portions and then threads the new end thus formed through the camera and into the receiving box 9 within the camera. This end thus being free of kinks will readily follow the guides within the box and coil upon itself as the film is drawn through the camera.

It will be apparent that this kinking or bending the film at the line 13 between the cut out portions will also be of value in the tearing operation, enabling the user to tear the film at this point in a comparatively straight line.

Of course, changes may be made by way of detail without departing from the scope of my invention. I do not limit myself therefore to the exact form shown other than by the appended claims.

I claim:—

1. A film package comprising a receptacle having a roll of film therein, a slot in said receptacle through which an end of said film extends. and recesses in said film end at the point of projection from said receptacle.

2. A film package comprising a receptacle, a roll of film therein and having a protruding end, substantially V-shaped notches cut into said end from the sides thereof at diametrically opposed points, said notches extending to near the center of said film and located at the point of projection from the receptacle.

CARL BORNMANN.